United States Patent
Fukatsu

(10) Patent No.: US 7,934,114 B2
(45) Date of Patent: Apr. 26, 2011

(54) METHOD OF CONTROLLING INFORMATION PROCESSING DEVICE, INFORMATION PROCESSING DEVICE, PROGRAM, AND PROGRAM CONVERTING METHOD

(75) Inventor: Gen Fukatsu, Osaka (JP)

(73) Assignee: PANASONIC Corporation, Osaka (JP)

( * ) Notice: Subject to any disclaimer, the term of this patent is extended or adjusted under 35 U.S.C. 154(b) by 995 days.

(21) Appl. No.: 11/757,548

(22) Filed: Jun. 4, 2007

(65) Prior Publication Data

US 2008/0005607 A1    Jan. 3, 2008

(30) Foreign Application Priority Data

Jun. 28, 2006 (JP) ................................. 2006-178607

(51) Int. Cl.
*G06F 1/04* (2006.01)
*G06F 1/14* (2006.01)

(52) U.S. Cl. ........ 713/500; 713/501; 713/502; 711/128; 711/167

(58) Field of Classification Search .................. 713/500, 713/501, 502; 711/128, 167
See application file for complete search history.

(56) References Cited

U.S. PATENT DOCUMENTS

| 7,694,075 | B1 * | 4/2010 | Feekes, Jr. ..................... 711/119 |
| 2004/0225631 | A1 * | 11/2004 | Elnaffar et al. ................... 707/1 |
| 2005/0081002 | A1 | 4/2005 | Chang et al. |
| 2005/0138165 | A1 * | 6/2005 | Tang et al. ..................... 709/224 |
| 2007/0186123 | A1 * | 8/2007 | Winbom ....................... 713/322 |

FOREIGN PATENT DOCUMENTS

| JP | 11-134077 | 5/1999 |
| JP | 2000-148582 | 5/2000 |
| JP | 2005-115769 | 4/2005 |

OTHER PUBLICATIONS

English language Abstract of JP 11-134077.
English language Abstract of JP 2000-148582.
English language Abstract of JP 2005-115769.

* cited by examiner

*Primary Examiner* — Thomas Lee
*Assistant Examiner* — Michael J Brown
(74) *Attorney, Agent, or Firm* — Greenblum & Bernstein, P.L.C.

(57) ABSTRACT

The method of controlling an information processing device according to the present invention is a method of controlling an information processing device which includes a processor having a cache memory, and a clock supplying unit that supplies a clock signal to the processor. The method includes: predicting a hit rate of the cache memory; and controlling the clock supplying unit so as to change a frequency of the clock signal in accordance with the predicted hit rate.

18 Claims, 13 Drawing Sheets

FIG. 6A

| Event No. | Second Process | Predicting hit rate (%) |
|---|---|---|
| 1 | Transfer data from recording medium to memory | 0, 5, 10 |
| 2 | Transfer data from memory to recording medium | 50, 40, 30 |
| 3 | Copy memory | 40, 30, 20 |
| 4 | Flush cache memory | 0 ~ 40 |
| 5 | Activate application program | 0 ~ 20 |
| 6 | Finish application program | 50, 40, 30 |
| 7 | Suspend application program | ... |
| 8 | Restart application program | (Saving value)·a·t |
| 9 | MMU access violation | 10 |
| 10 | TLB miss hit | 10 |
| 11 | Interrupt pre-process | 80 |
| 12 | Interrupt handler A | 5 |
| 13 | Interrupt handler B | 40 |
| : | : | : |

FIG. 6B

| System call No. | Second Process | Predicting hit rate (%) |
|---|---|---|
| 1 | Socket system call | 10, 20 |
| 2 | File read system call | 10, 20 |
| 3 | File write system call | 50, 40, 30 |
| 4 | File attribute change system call | Unchanged |
| 5 | Memory region change system call | 0 ~ 20 |
| 6 | Signal system call | Unchanged |
| : | : | : |

| Predicting hit rate | CPU clock | Bus clock | Memory clock |
|---|---|---|---|
| 80 ~ 100 | fc1 (Fast) | fb1 (Slow) | fm1 (Slow) |
| 60 ~ 80 | fc2 | fb2 | fm2 |
| 40 ~ 60 | fc3 | fb3 | fm3 |
| 20 ~ 40 | fc4 | fb4 | fm4 |
| 0 ~ 20 | fc5 (Slow) | fb5 (Fast) | fm5 (Fast) |

FIG. 7A

| Predicting hit rate | CPU voltage | Bus voltage | Memory voltage |
|---|---|---|---|
| 80 ~ 100 | Vc1 (Low) | Vb1 (High) | Vm1 (High) |
| 60 ~ 80 | Vc2 | Vb2 | Vm2 |
| 40 ~ 60 | Vc3 | Vb3 | Vm3 |
| 20 ~ 40 | Vc4 | Vb4 | Vm4 |
| 0 ~ 20 | Vc5 (High) | Vb5 (Low) | Vm5 (Low) |

| System call No. | Second Process | Predicting hit rate (‰) |
|---|---|---|
| .. | .. | .. |
| 100 | Time out | 50 |
| 101 | Suspend application program | 50 |
| 102 | Restart application program | (Saving value)・a・t |
| .. | .. | .. |

METHOD OF CONTROLLING INFORMATION PROCESSING DEVICE, INFORMATION PROCESSING DEVICE, PROGRAM, AND PROGRAM CONVERTING METHOD

BACKGROUND OF THE INVENTION (1) Field of the Invention

The present invention relates to: a method of controlling an information processing device which includes a processor having a cache memory, and a clock supplying unit which supplies a clock signal to the processor; an information processing device; a program; and a program converting method.

(2) Description of the Related Art

As a conventional technology related to controlling electric power consumption of an information processing device, there is a method of controlling a clock frequency of a Central Processing Unit (CPU) in accordance with a cache hit rate (see, for example, Japanese Unexamined Patent Application Publications No. 11-134077, No. 2000-148582 and No. 2005-115769). The information processing device includes hardware which is exclusively used for measuring a cache hit rate of the CPU, and increases the clock frequency of the CPU when the cache hit rate is high, and decreases the clock frequency of the CPU when the cache hit rate is low. With use of this method, it is possible to more effectively reduce electric power consumption, compared to when the clock frequency is constant.

FIG. 1 is a block diagram showing configuration of an information processing device for which the conventional method is used. This information processing device includes a CPU 0101 having a built-in cache, a cache hit rate monitoring circuit 0102, and a clock controlling unit 0103 which controls a clock of the CPU.

The following is a description of operations of the conventional information processing device configured in such manner as described above.

The cache hit rate monitoring circuit 0102 derives a hit rate of the cache equipped in the CPU 0101, and inputs the derived hit rate to the clock controlling unit 0103 as cache hit rate information 0104. The clock controlling unit 0103 controls a frequency of a clock 0105 which is to be supplied to the CPU 0101 in accordance with the cache hit rate information 0104. In doing so, the clock controlling unit 0103 increases the clock frequency of the CPU 0101 when the cache hit rate is high, and decreases the clock frequency of the CPU 0101 when the cache hit rate is low. At the same time, the clock controlling unit 0103 decreases clock frequencies of a bus and a memory connected to the CPU 0101 when the cache hit rate is high, and increases the clock frequencies of the bus and the memory when the cache hit rate is low.

Therefore, the CPU effectively performs its processing when the hit rate is high, and the speed of the bus and the memory is increased when the hit rate is low. In other words, the conventional method attempts to achieve both an improvement in processing efficiency and a reduction in electric power consumption.

SUMMARY OF THE INVENTION

However, the above conventional technology has a problem that controlling the clock frequency of the CPU after there is a change in the cache hit rate results in a slow response. FIG. 2 is a graph showing changes in the cache hit rate, the clock frequency of the CPU, and the clock frequencies of the bus and the memory. As the figure shows, there is a delay time d from when the cache hit rate changes, until when the clock frequency of the CPU and the clock frequencies of the bus and the memory change. It is considered that the delay time d can be shortened by shortening a monitoring cycle monitored by the cache hit rate monitoring circuit 0102. Nonetheless, the shortened monitoring cycle may result in degraded accuracy in measuring the cache hit rate, and thus in a failure to achieve an improvement in processing efficiency and a reduction in electric power consumption.

As described above, the above mentioned conventional technology inevitably has an inherent problem that the response time is long from when the cache hit rate changes until the clock frequency of the CPU is controlled. Consequently, the improvement in the processing efficiency is not fully achieved even when the reduction in the electric power consumption is realized.

In order to solve the above described problem, an object of the present invention is to provide: a method of controlling an information processing device which controls, in accordance with a cache hit rate, a CPU clock without generating a delay time; an information processing device; a program; and a program converting method.

In order to solve the above described problem, the preset invention is a method of controlling an information processing device which includes a processor having a cache memory, and a clock supplying unit that supplies a clock signal to the processor. The method includes: predicting a hit rate of the cache memory; and controlling the clock supplying unit so as to change a frequency of the clock signal in accordance with the predicted hit rate. With this structure, a frequency of the clock signal is controlled in accordance with the predicted hit rate, and thus it is possible to eliminate the delay time from when the cache hit rate changes until the clock frequency of the CPU is controlled. As a result, it is possible to optimally achieve both a reduction in the electric power consumption and an improvement in the processing efficiency which are trade-offs of each other. Furthermore, since it is not necessary to mount special hardware used for monitoring the actual cache hit rate, a circuit area of the information processing device can be smaller. In an example case of mobile terminal devices, consumption of batteries can be reduced, and the circuit can be minitualized.

Here, the predicting may include: detecting an occurrence of a first process in the processor; identifying a type of a second process which starts as a result of the detected occurrence of the first process; and predicting the hit rate in accordance with the identified type. With this structure, mounting special hardware used for monitoring an actual cache hit rate is unnecessary, and it is possible to easily predict a hit rate by software or hardware. In addition, for example, when a hit rate table and the like in which types of the second processes and hit rates correspond with each other is provided in advance, it is possible to accurately predict a hit rate.

Here, the predicting may further include predicting that the hit rate increases above a predetermined value in the case where the first process is not detected during a predetermined period of time. With this structure, in the case where the first process is not detected during the predetermined period of time, it is predicted that the hit rate gradually increases since there is no particular factor causing the hit rate to decrease. Therefore, it is possible to improve the processing efficiency of the processor.

Here, the first process may be an event which occurs in an operating system, and the predicting may include predicting that the hit rate falls below a predetermined value in the case where the second process is identified as a process of transferring data between a recording medium and a memory. With this structure, in the case of transferring data between the recording medium and the memory, for example in the case of loading data (or a program) stored in a storage medium or a hard disk to the memory, it is possible to easily predict that the hit rate falls below the predetermined value.

Here, the predicting may include predicting the hit rate in accordance with the size of the data transferred. With this structure, the larger the size of transferred data, the more the cache hit rate is likely to decrease, and thus it is possible to more accurately predict the hit rate.

Here, the predicting may further include predicting that the hit rate falls below the predetermined hit rate in the case where the second process is identified as: a process of activating a new application program; a process of flushing the cache memory; or a process of copying a region between the memories. With this structure, in the case where the cache memory is flushed or the region is copied between memories, there is a likelihood that the hit rate decreases, and thus it is possible to easily predict the hit rate.

Here, the information processing device may include a memory management unit which converts a virtual address into an actual address for virtual storage of a demand loading mechanism. Here, the first process may be an access violation in the memory management unit, and the predicting may include predicting that the hit rate falls below a predetermined value in the case where the second process is identified as a process of performing the demand loading. With this structure, in the case of carrying out demand loading due to the access violation in the memory management unit, there is a likelihood that the hit rate decreases, and thus it is possible to easily predict the hit rate.

Here, the memory management unit may further have a table of a software table walk, for temporarily flushing the virtual address and the actual address corresponding to the virtual address. Here, the first process may be an access miss in the table, and the predicting may include predicting that the hit rate falls below the predetermined value in the case where the second process is identified as a process of updating the table. With this structure, in the case of performing the process of updating the above mentioned table, there is a likelihood that the hit rate decreases, and thus it is possible to easily predict the hit rate.

Here, the first process may be an interrupt, and the predicting may include: predicting that the hit rate is higher than a predetermined value in the case where the second process is identified as a pre-process of identifying a type of the interrupt; and predicting that the hit rate is lower than the predetermined value in the case where the second process is identified as an individual process unique to the identified type of the interrupt. With this structure, the pre-process is a common process performed irrespective of the type of the interrupt, and thus there is a likelihood that the cache hit rate is high. Conversely, the individual process is dependent on the type of the interrupt, and thus there is a likelihood that the hit rate is low. Therefore, it is possible to easily predict the hit rate.

Here, the predicting may further include: identifying a type of an input/output unit in the case where the individual process is a process of controlling the input/output unit; and predicting the hit rate in accordance with the identified type of the input/output unit. With this structure, details of the individual process vary depending on the type of the input/output unit, and thus the degree of the change in the cache hit rate varies. Using this property, it is possible to more accurately predict the hit rate.

Here, the method of controlling the information processing device may further include measuring an occurrence-frequency of the interrupt for each type of the interrupt, and predicting may further include predicting the hit rate in accordance with the occurrence-frequency of the identified individual process. With this structure, using the property that the higher the occurrence-frequency, the more the hit rate is likely to increase, it is possible to more accurately predict the hit rate.

Here, the first process may be a system call, and the predicting may include: identifying a system call number as the second process; and predicting the hit rate in accordance with the identified system call number. With this structure, a device access attributable to a system call, an acquirement of a new region, and the like lead to a likeliness that the cache hit rate decreases, and thus it is possible to easily predict the hit rate. In addition, details of the process of each system call are distinguished by the system call number, and the degree of the change in the cache hit rate varies depending on the details of the process. Therefore, it is possible to more accurately predict the hit rate.

Here, the information processing device may include a monitoring unit which monitors the hit rate of the cache memory, and the method of controlling the information processing device may further include saving a hit rate of an application program when the application program is suspended. Here, the first process may a process of restarting the suspended application program, and the predicting may include: identifying a type of the application program which needs to restart; and predicting a hit rate of the restarted application program in accordance with the saved hit rate of the identified application program. With this structure, it is possible to easily predict the hit rate of the restarted application program, in accordance with the saved hit rate.

Here, the predicting may include predicting the hit rate in accordance with a period of time from when the application program is suspended until when the suspended application program restarts. With this structure, the longer the time elapsed until the restart, the less likelihood that the cache memory still has data of the restarted application program at the time of the restart, and thus it is possible to accurately predict the hit rate of the restarted application program.

Here, the information processing device may include a monitoring unit which monitors the hit rate of the cache memory, and the predicting may include predicting the hit rate based on a history of a hit rate monitored by the monitoring unit. With this structure, it is possible to accurately predict the hit rate of the restarted application program in accordance with the history.

Here, the information processing device may include a memory management unit which converts a virtual address into an actual address for virtual storage of a demand loading mechanism, the memory management unit may further have a table of a hardware table walk, for temporarily flushing the virtual address and the actual address corresponding to the virtual address, and the predicting may include predicting the hit rate based on an updating-frequency and the history of the past hit rate.

Here, the information processing device may further include a power unit which supplies power to the processor, and the controlling may further include controlling the power unit so as to change a power voltage of the power supplied to the processor in accordance with the predicted hit rate. With this structure, it is further possible to optimize a reduction in the electric power consumption.

Here, the information processing device according to the present invention includes: a processor having a cache memory; a clock supplying unit which supplies a clock signal to the processor; a predicting unit which predicts a hit rate of the cache memory; and a controlling unit which controls the clock supplying unit so as to changes a frequency of the clock signal in accordance with the predicted hit rate.

Here, the program according to the present invention is a program for controlling a computer which includes a clock supplying unit that supplies a clock signal to a processor, the program causing the computer to execute: predicting a hit rate of the cache memory; and controlling the clock supplying unit so as to change a frequency of the clock signal in accordance with the predicted hit rate.

Here, the program converting method according to the present invention is a program converting method of converting a first program into a second program, in which the second program is used for an information processing device which includes a processor having a cache memory and a clock supplying unit which supplies a clock signal to the processor. The program converting method includes: predicting a hit rate of a predetermined section of the first program; and generating the second program by adding, to the first program, an instruction which specifies a frequency of the clock signal in the predetermined section in accordance with the predicted hit rate.

Here, the predetermined section may be the second process which starts due to the first process, and the predicting may include: identifying a type of the second process, predicting the hit rate of the cache memory during the second process in accordance with the identified type; and adding, to the end of the first process or to the head of the second process, the instruction by the clock supplying unit which specifies the frequency of the clock signal in accordance with the predicted hit rate.

According to the present invention, since the frequency of the clock signal is controlled in accordance with a predicted hit rate, it is possible to eliminate the delay time from when the cache hit rate changes until the clock frequency of the CPU is controlled. As a result, it is possible to optimally achieve both a reduction in the electric power consumption and an improvement in the processing efficiency which are trade-offs of each other. Furthermore, since it is not necessary to mount hardware which is exclusively used for monitoring the actual cache hit rate, a circuit area of the information processing device can be smaller. In an example case of mobile terminal devices, consumption of batteries can be reduced, and the circuit can be minitualized.

FURTHER INFORMATION ABOUT TECHNICAL BACKGROUND TO THIS APPLICATION

The disclosure of Japanese Patent Application No. 2006-178607 filed on Jun. 28, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6A is a diagram showing a prediction table which shows events and predicting hit rates.

FIG. 6B is a diagram showing a prediction table which shows system calls and predicting hit rates.

FIG. 7A is a diagram showing a table of clock frequencies corresponding to predicting hit rates.

FIG. 7B is a diagram showing a table of power voltages corresponding to predicting hit rates.

FIG. 11 is a diagram showing a prediction table which shows events and predicting hit rates.

DESCRIPTION OF PREFERRED EMBODIMENTS

With reference to the drawings, details of preferred embodiments of the present invention are described.

First Embodiment

The present embodiment describes an information processing device which includes a processor having a cache memory, a clock supplying unit which supplies a clock signal to the processor, and a power unit which supplies a power voltage to the processor. The information processing device predicts a hit rate of the cache memory, controls the clock supplying unit so as to change a frequency of the clock signal in accordance with the predicted hit rate, and controls the power unit so as to change a power voltage in accordance with the predicted hit rate.

Figure 1:
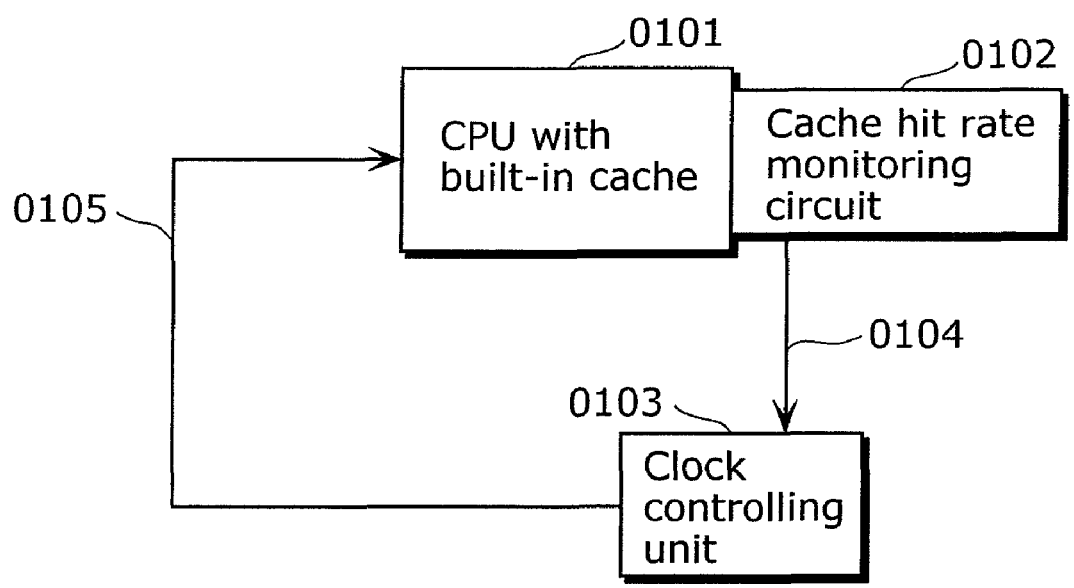
FIG. 1 is a block diagram showing configuration of a conventional information processing device.
Figure 2:
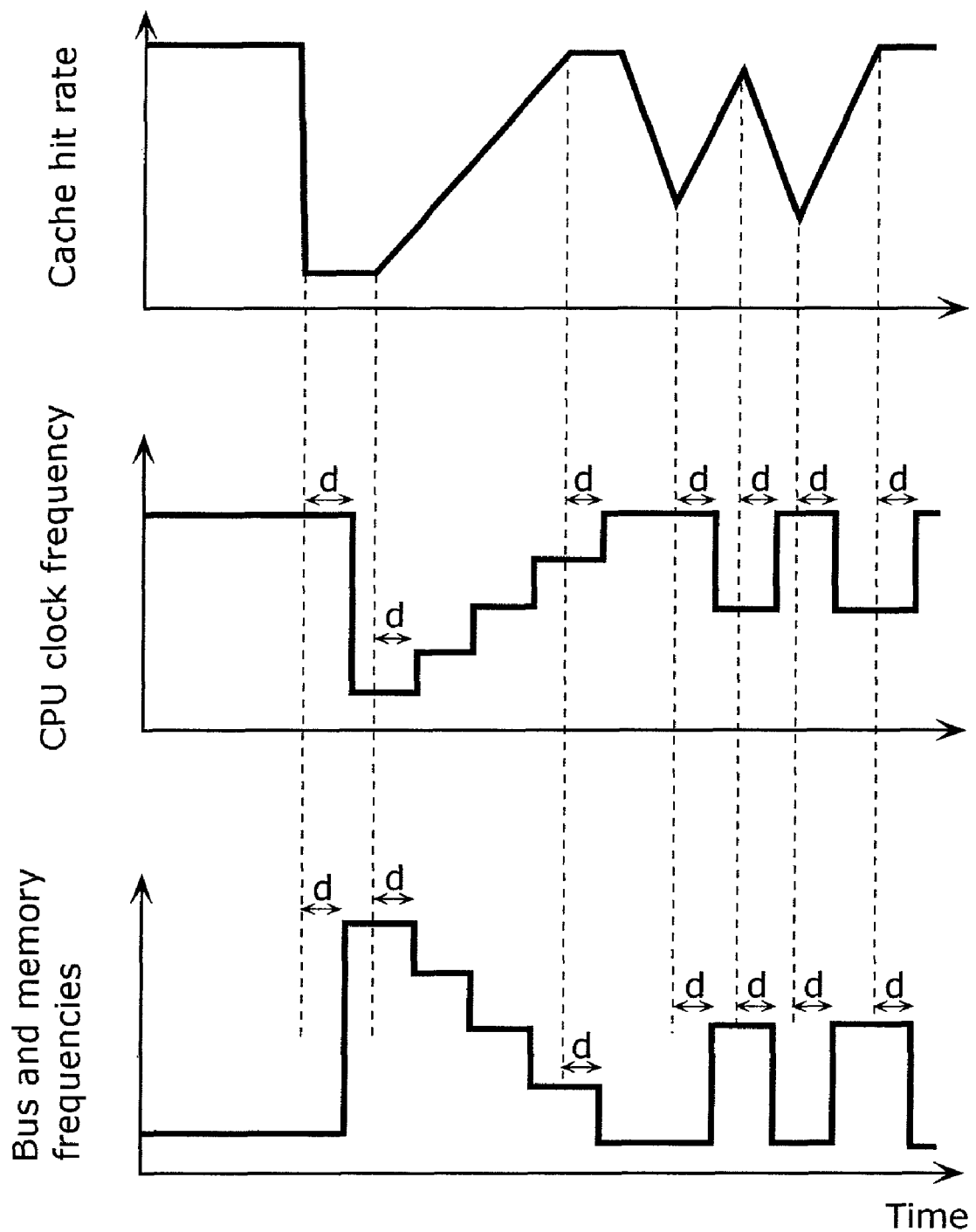
FIG. 2 is a graph showing changes in a cache hit rate, a clock frequency of a CPU, and clock frequencies of a bus and a memory.
Figure 3:
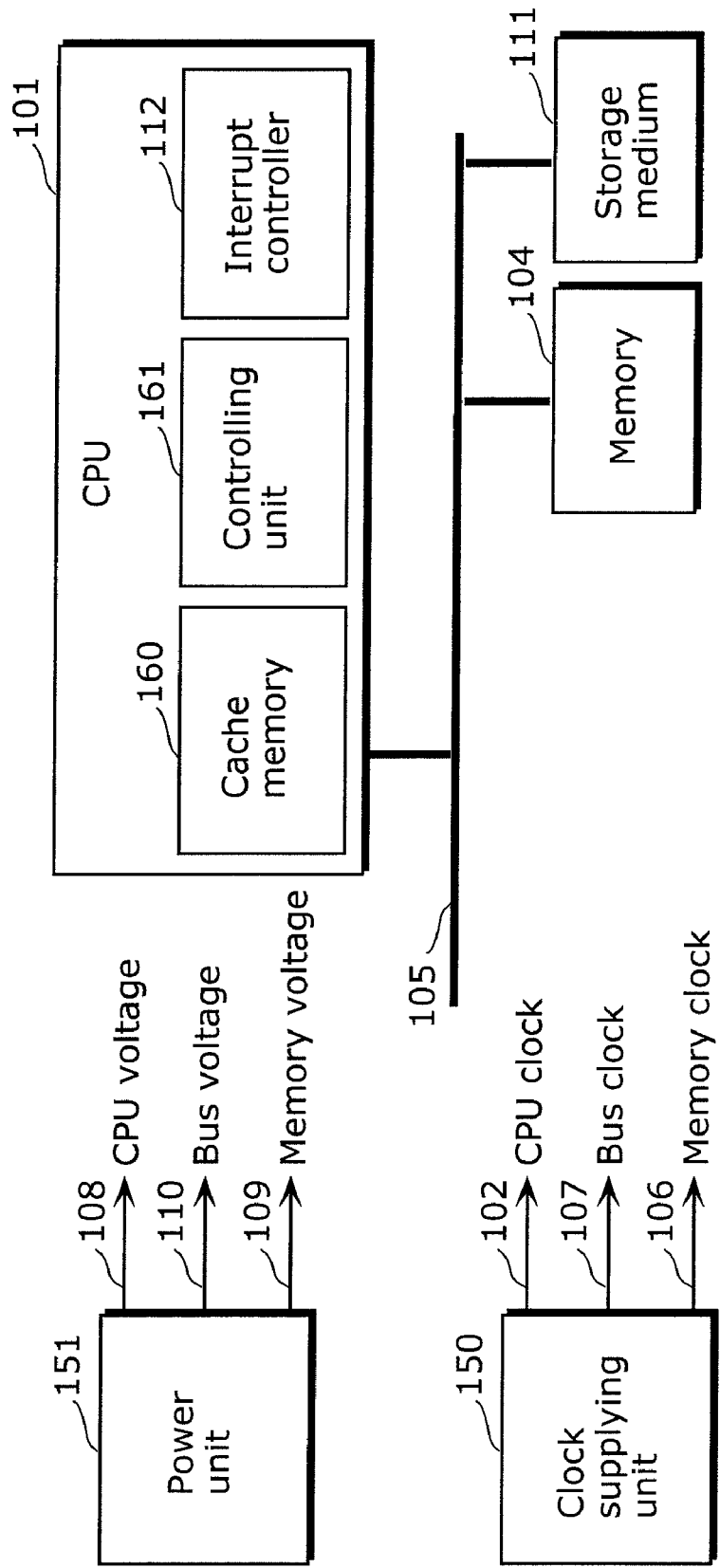
FIG. 3 is a block diagram showing configuration of an information processing device according to a first embodiment.

FIG. 3 is a block diagram showing configuration of the information processing device according to the first embodiment. The information processing device includes a CPU 101, a memory 104, a storage medium 111, a clock supplying unit 150, and a power unit 151.

The CPU 101 includes a cache memory 160, a controlling unit 161, and an interrupt controller 112.

The cache memory 160 is used as a data cache or an instruction cache.

The controlling unit 161: predicts a hit rate of the cache memory 160; determines a frequency of the clock signal in accordance with the predicted hit rate; and controls the clock supplying unit 150 so as to change to the determined frequency. The controlling unit 161 also determines a power voltage in accordance with the determined frequency, and controls the power unit 151 so as to change to the determined power voltage.

Figure 4:
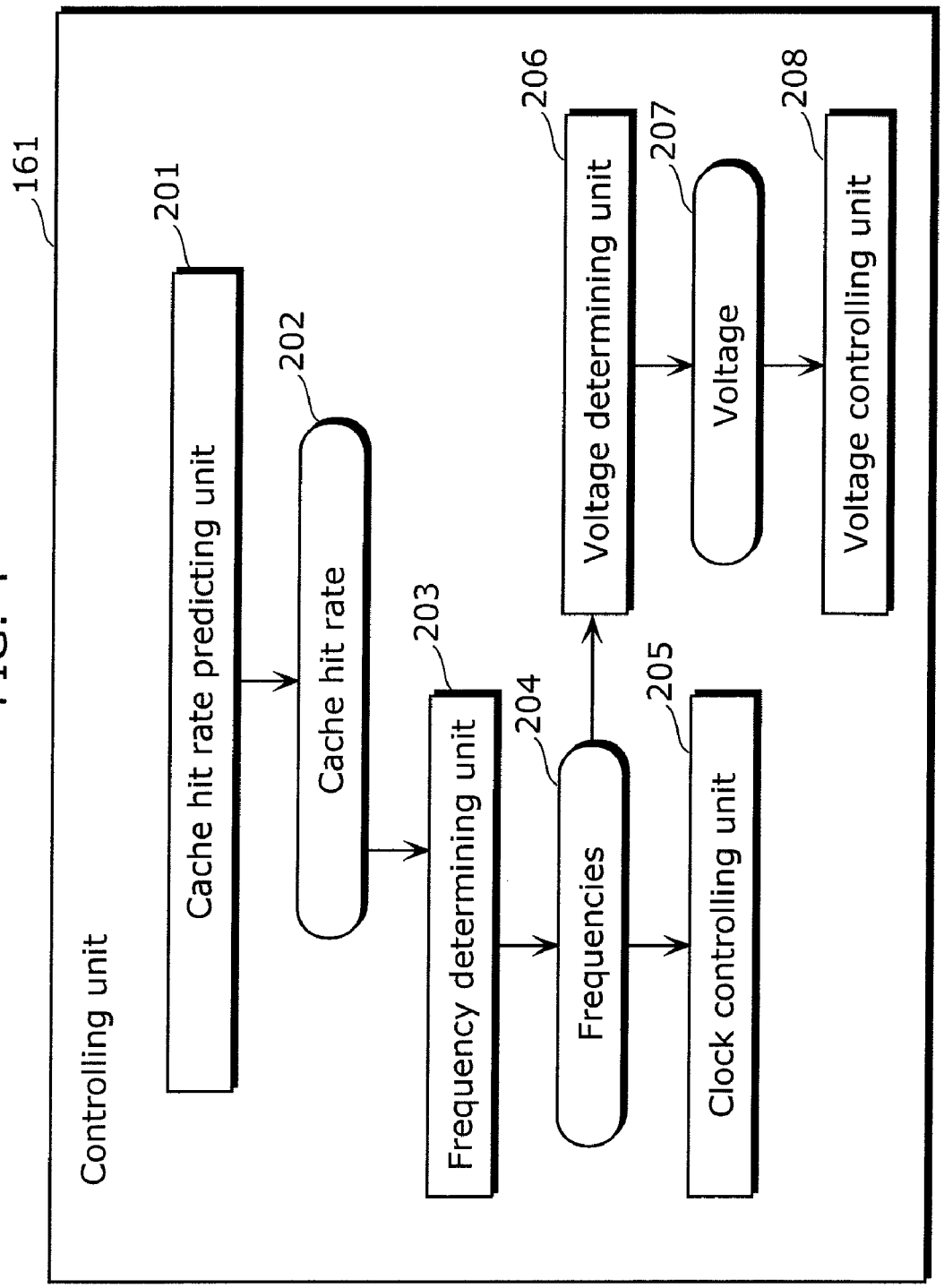
FIG. 4 is a block diagram showing configuration of a controlling unit.

FIG. 4 is a block diagram showing detailed configuration of the controlling unit 161. The controlling unit 161 includes a cache hit rate predicting unit 201, a frequency determining unit 203, a clock controlling unit 205, a voltage determining unit 206, and a voltage controlling unit 208. These functions of the controlling unit 161 are described as functions added to a part of an Operating System (hereinafter referred to as "OS"). First, an overview of an operation of the controlling unit 161 is provided.

Figure 5:
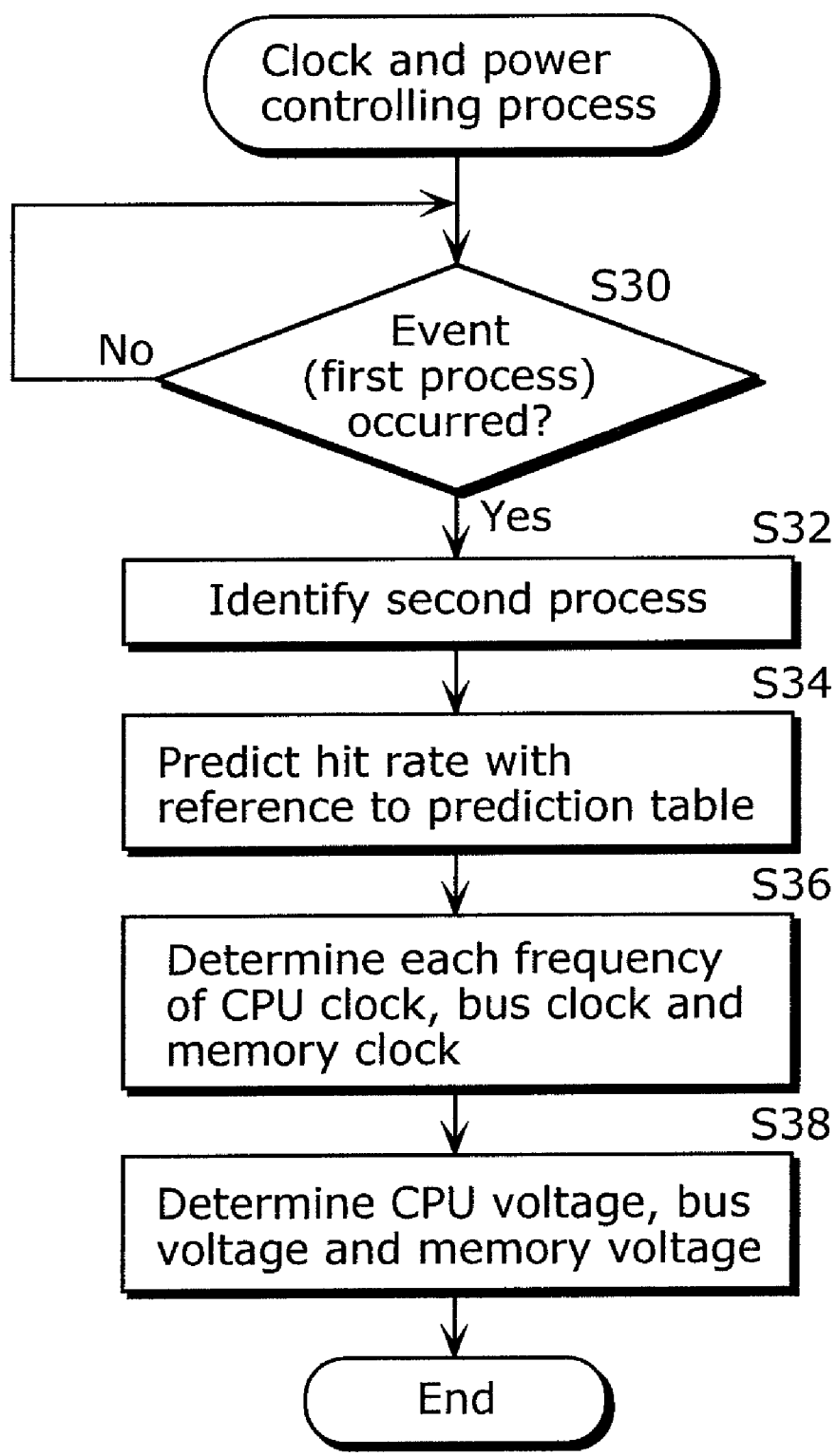
FIG. 5 is a diagram showing a flowchart of a process performed by a cache hit rate predicting unit.

FIG. 5 is a flowchart showing the overview of operations of the controlling unit 161. The cache hit rate predicting unit 201 detects an occurrence of a first process in the CPU 101 (S30), identifies a type of a second process which starts or is called by the occurrence of the detected first process (S32), and predicts the above mentioned hit rate in accordance with the identified type of the second process (S34). Based on the cache hit rate 202 determined by the cache hit rate predicting unit 201, the frequency determining unit 203 determines frequencies 204 which include a frequency of a CPU clock 102, a frequency of a memory clock 106, a frequency of a bus clock 107 (S36). The clock controlling unit 205 controls the clock supplying unit 150 so as to supply a clock signal corresponding to the frequencies 204 determined by the frequency determining unit 203. Further, based on the frequencies 204, the voltage determining unit 206 determines a voltage 207 which is at least one or more of a CPU voltage 108, a memory voltage 109, and a bus voltage 110 (S38). The voltage controlling unit 208 sets at least one of the CPU voltage 108, the memory voltage 109, and the bus voltage 110 in accordance with the voltage 207 determined by the voltage determining unit 206. As described, by controlling the frequencies 204 of the CPU 101 based on the cache hit rate 202 predicted by the cache hit rate predicting unit 201, the controlling unit 161 decreases the frequencies 204 of the CPU 101 when the cache hit rate 202 is low, and increases the frequencies 204 of the CPU 101 when the cache hit rate 202 is high. As a result, the controlling unit 161 can optimally control the electric power consumption.

More specifically, the above mentioned first process refers to each of various events that occur in the OS. The various events include events such as system calls, interrupts, exception processes, switching of application programs (task switching), activation of application programs, and completion of application programs. The second process refers to a process which starts as a result of these events or which is called up by these events.

For example, when an event (the first process) is an event of instructing file reading, the second process is identified as a process of transferring data between a recording medium and a memory. In such a case, the cache hit rate predicting unit 201 predicts that the hit rate falls below a predetermined value. With reference to FIG. 6A, an example of predicting the hit rate is described.

FIG. 6A is a diagram showing a prediction table which contains the second processes corresponding to events and predicting hit rates. The cache hit rate predicting unit 201 obtains a predicting hit rate by referring to a prediction table such as the one shown in FIG. 6A.

The frequency determining unit 203 determines the clock frequencies 204 based on the hit rate 202 predicted by the cache hit rate predicting unit 201. The clock frequencies 204 include a frequency of the CPU clock 102, a frequency of the bus clock 107, and a frequency of the memory clock 106. With reference to FIG. 7A, an example of a method of determining the frequencies is described.

FIG. 7A is a diagram showing a table which contains clock frequencies 204 that are suitable for predicting hit rates. The frequency determining unit 203 obtains a frequency by referring to a frequency table shown in FIG. 7A. The frequency table shown in FIG. 7A stores in advance frequencies of the CPU clock 102, frequencies of the bus clock 107, and frequencies of the memory clock 106, making these frequencies correspond with predicting hit rates. This frequency table is set in such manner that when it is predicted that the cache hit rate 202 decreases, the frequency of the CPU clock 102 is decreased, and when it is predicted that the cache hit rate 202 increases, the frequency of the CPU clock 102 is increased. Therefore, the consumption of electric power can be optimally controlled.

The clock controlling unit 205 controls the clock supplying unit 150 so as to supply each clock signal which is in accordance with the frequencies 204 determined by the frequency determining unit 203.

The voltage determining unit 206 determines the CPU voltage 108, the memory voltage 109, and the bus voltage 110 based on the frequencies 204 determined by the frequency determining unit 203. Note that the voltage determining unit 206 may determine the CPU voltage 108, the memory voltage 109, and the bus voltage 110 based on a predicting hit rate. With reference to FIG. 7B, an example of a method of determining the voltages is described.

FIG. 7B is a diagram showing a table which contains the CPU voltages 108, the bus voltages 110, and the memory voltages 109 which are suitable for predicting hit rates.

The voltage controlling unit 208 controls the power unit 151 so as to supply each power voltage in accordance with the voltage 207 determined by the voltage determining unit 206.

Note that although, in the present embodiment, the controlling unit 161 is described as a function added to a part of the OS, the controlling unit 161 may be embodied in a program other than the OS, or embodied as hardware.

The storage medium 111 is a recording medium such as a hard disk and an optical disk.

The interrupt controller 112 controls interrupts to the CPU 101. Each type of the interrupts to the CPU 101 is handled as a part of the above events (first processes) by the controlling unit 161.

The following is a description of operations of the information processing device which is configured in such manner as described above. The above events (first processes) include various events such as events which occur within the OS, events which occur as system calls from application programs, and events which occur as interrupts from outside.

First, the following describes operations, performed by the controlling unit 161, of predicting a hit rate in accordance with details of the second process called from an event, irrespective of the type of the event.

For example, as shown in the event No. 1 in FIG. 6A, when the second process which corresponds to an event is a process of loading data stored in the storage medium 111 to the memory 102, the cache hit rate predicting unit 201 predicts that the cache hit rate of the CPU 101 is low from the start until the end of the loading.

Further, as shown in the event No. 5 in FIG. 6A, when the second process which corresponds to an event is a process of activating an application program stored in the storage medium 111, the OS usually reads the application program from the storage medium 111, and loads the application program in the memory 102. In doing so, since there is a high likelihood that a hit does not occur in the cache of the CPU 101 for an access to the storage medium 111, the cache hit rate predicting unit 201 predicts that the cache hit rate is low, and determines the cache hit rate 202 accordingly.

For example, as shown in the event No. 3 in FIG. 6A, when the second process which corresponds to an event is a process of carrying out a memory copying function or a memory filling function to a region, the region is often unused and the cache hit rate is likely to decrease. Therefore, the cache hit rate predicting unit 201 predicts that the cache hit rate decreases and determines the cache hit rate 202 accordingly.

Further, after performing the second process which corresponds to an event, that is, as shown in the event No. 4 in FIG. 6A, after performing a process of flushing all of, or most of the cache region, the cache hit rate of the CPU 101 is likely to fall, and therefore the cache hit rate predicting unit 201 predicts that the cache hit rate of the CPU 101 is low, and determines the cache hit rate 202 accordingly. For example, in order to create consistency between an external memory and the cache, there are cases where the OS flushes the cache.

For example, as shown in the event No. 3 in FIG. 6A, when the second process which corresponds to an event is a process of carrying out the memory copying function or the memory filling function, the larger the region to be copied or filled, the higher the likelihood that the cache hit rate decreases. Therefore, the cache hit rate predicting unit 201 predicts the cache hit rate in accordance with the size, and determines the cache hit rate 202 accordingly.

Further, as shown in the event No. 5 in FIG. 6A, when the second process which corresponds to an event is a process of activating an application program, there is no application program in the cache of the CPU 101 to be executed immediately after the activation, and the cache hit rate is likely to decrease. Therefore, the cache hit rate predicting unit 201 predicts that the cache hit rate decreases, and determines the cache hit rate 202 accordingly.

Next, the following describes a case where, as shown in the event No. 9 in FIG. 6A, the second process which corresponds to an event is an MMU access violation. Here, the CPU 101 is assumed to internally have a memory management unit (hereinafter referred to as "MMU") which converts a virtual address into an actual address for virtual storage of a demand loading mechanism. For example, in a case of an OS such as Linux, a method of not assigning an actual memory until an access actually occurs, is used (hereinafter referred to as "demand loading"). In order to realize this demand loading, access authorization is set in such manner that the access is prohibited until an access actually occurs, using an access authorization function which is a function of the MMU. When a region, an access to which is prohibited, is accessed, an exception process occurs and is processed by the OS. After the demand loading occurs, a memory which is newly assigned is often accessed, and thus there is a high likelihood that the access does not hit the cache of the CPU 101. Therefore, the cache hit rate predicting unit 201 predicts that the cache hit rate is low, and determines the cache hit rate 202 accordingly.

Further, the following describes a case where, as shown in the event No. 10 in FIG. 6A, the second process is a TLB miss hit event. Here, the above described MMU further has a Table Lookaside Buffer (hereinafter referred to as "TLB") of a software table walk, for temporarily caching a virtual address and a corresponding actual address.

When a TLB miss hit occurs, it often shows that an access to a region which has conventionally not been accessed has started, and the cache hit rate is likely to decrease hereafter. Therefore, when detecting the TLB miss hit, the cache hit rate predicting unit 201 predicts that the cache hit rate decreases, and determines the cache hit rate 202 accordingly.

Note that with the TLB of the software table walk installed in the CPU 101, the OS updates an entry of the TLB when a miss hit occurs in the TLB, and thus the occurrence of the TLB miss hit can be detected by the cache hit rate predicting unit 201.

Further, when the TLB miss hit and updating of the TLB occur in the CPU 101, the cache hit rate predicting unit 201 determines the cache hit rate 202 based on details of the updated TLB entry. For example, when the details of the updated TLB entry indicate a non-cache attribute, there is a high possibility that the region which is to about be accessed is a non-cache region, and there is a likelihood that the cache hit rate decreases hereafter. Therefore, when the TLB entry which is updated after the detection of the TLB miss hit indicates the non-cache attribute, the cache hit rate predicting unit 201 may predict that the cache hit rate decreases and determine the cache hit rate 202 accordingly.

Next, the following describes operations performed by the controlling unit 161 in regard to interrupts as parts of the above events (the first process).

For example, as shown in the event No. 11 in FIG. 6A, in the case where the second process which corresponds to an event is an interrupt pre-process, the OS starts an interrupt when an interrupt 114 issued by the interrupt controller 112 is accepted by the CPU 101. The interrupt can mainly be divided into: a pre-process part in which a process, such as identification of a type of an interrupt, is performed; and an interrupt handler process in which a process is performed in accordance with the type of the interrupt. Since the pre-process part is a common process performed irrespective of the type of the interrupt, there is a likelihood that the cache hit rate is high. Therefore, from when the interrupt starts until when each interrupt handler process is carried out, the cache hit rate predicting unit 201 predicts that the cache hit rate is high, and determines the cache hit rate 202 accordingly.

Also, as shown in the event No. 12 and 13 in FIG. 6A, when the second process which corresponds to an event is an interrupt handler process, that is, the interrupt handler process carried out after the pre-process of the interrupt in accordance with the type of the interrupt, there is a likelihood that the cache hit rate is low, because the interrupt handler process is a process of operating a peripheral device of the CPU 101. Using this property, in each interrupt handler process, the cache hit rate predicting unit 201 predicts that the cache hit rate is low, and determines the cache hit rate 202 accordingly. Details of each interrupt handler process differ depending on the type of the device, and thus the degree of the change in the cache hit rate varies. Consequently, the cache hit rate predicting unit 201 predicts the cache hit rate of each interrupt handler process in accordance with the type of the device, and determines the cache hit rate 202 accordingly.

Note that the cache hit rate predicting unit 201: manages an occurrence-frequency of each interrupt; predicts the cache hit rate of each interrupt handler process in accordance with the occurrence-frequency, using the property that the higher the occurrence-frequency of the interrupt, the higher the cache hit rate; and determines the cache hit rate 202 accordingly. This occurrence-frequency may be dynamically managed or be managed using a predetermined static value.

In addition, the following describes operations, performed by the controlling unit 161, of handling a system call as a part of the above described events. When a system call (also known as "software interrupt") is issued to the OS, the functions of the OS can be used in the application program. When the functions of the OS, such as a device access and an acquirement of a new region, are carried out, there is a likelihood that the cache hit rate decreases. Therefore, after the system call is issued, the cache hit rate predicting unit 201 predicts that the cache hit rate decreases, and determines the cache hit rate 202 accordingly.

Furthermore, as shown in FIGS. 6B and 11, details of the process of each system call are distinguished by the system call number, and the degree of the change in the cache hit rate varies depending on the details of the process of each system call. Therefore, after the system call is issued, the cache hit rate predicting unit 201 predicts the cache hit rate in accordance with the system call number, and determines the cache hit rate 202 accordingly.

FIGS. 6B and 11 are diagrams showing prediction tables which hold second processes and predicting hit rates which correspond to system call numbers. A socket system call having the system call number 1 is a system call for carrying out network communication, and thus a network device is frequently accessed. Therefore, the controlling unit 161 predicts that the hit rate decreases, and the predicting hit rate is very low.

A file read system call having the system call number 2 is a system call for a process of reading out a file from the storage medium 111, and thus the controlling unit 161 predicts that the hit rate is very low.

A file write system call having the system call number 3 is a system call for a process of writing a file in the storage medium 111, and thus the controlling unit 161 predicts that the hit rate is very low.

A file attribute change system call having the system call number 4 is a system call for accessing a file, however, only for changing an attribute (for example, access authorization and the owner of the file). Therefore, the controlling unit 161 predicts that although the hit rate slightly decreases, the rate is almost unchanged.

A memory region change system call having the system call number 5 is used for changing a memory region of a process program (for example, malloc). In particular, expanding the region means that an unknown region is accessed, and thus the larger the size of the expanded memory, the lower the hit rate the controlling unit 161 predicts.

A signal system call having the system call number 6 is a system call for an event notification from an application program to a different application. However, the notification itself is only a piece of data, and thus the controlling unit 161 predicts that the hit rate does not change.

Figure 8:
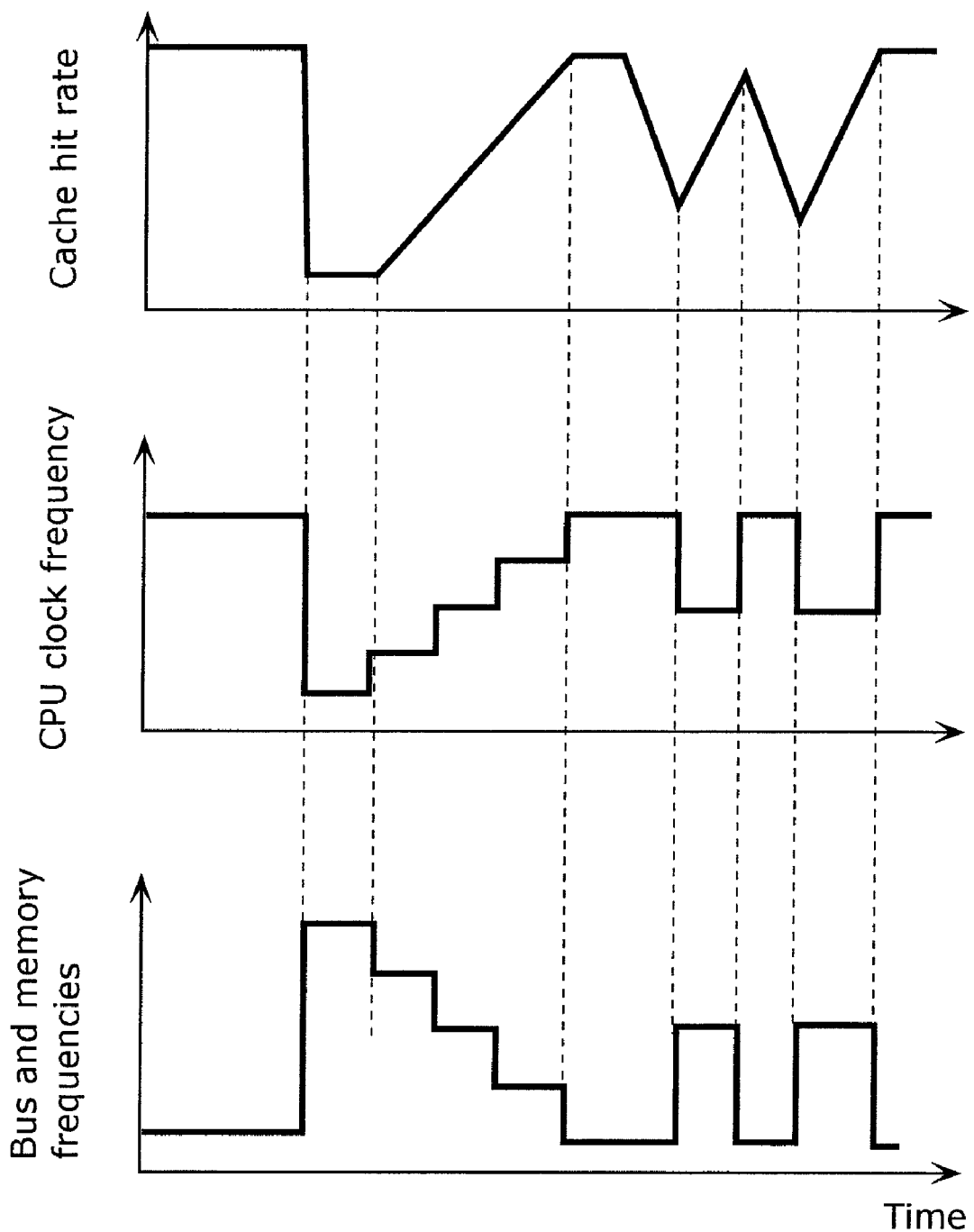
FIG. 8 is a diagram showing changes in a hit rate and changes in frequencies.

As described above and shown in FIG. 8, according to the information processing device of the present embodiment, a frequency of the clock signal is controlled in accordance with the predicted hit rate, and thus it is possible to eliminate the delay time from when the cache hit rate changes until the clock frequency of the CPU is controlled. As a result, it is possible to optimally achieve both a reduction in the electric power consumption and an improvement in the processing efficiency which are trade-offs of each other. Furthermore, since it is not necessary to mount special hardware used for monitoring the actual cache hit rate, a circuit area of the information processing device can be smaller. In an example case of mobile terminal devices, consumption of batteries can be reduced, and the circuit can be minitualized.

Note that the information processing device of the first embodiment is embodied as a Large-Scale Integration (LSI) which is a typical integrated circuit. Here, it is referred to as an LSI, however, it is sometimes referred to as an IC, a system LSI, a super LSI or an ultra LSI, depending on the degree of integration.

The information processing device of the first embodiment is applicable to mobile phones, accumulating and reproducing devices, digital TVs, on-vehicle apparatuses, and the like.

Further, when the frequency of the memory clock 106 and the frequency of the bus clock 107 are to be controlled, it is necessary to consider whether or not the memory 104 and the bus 105 are being used in a bus master circuit (for example, a Direct Memory Access Controller: DMAC) other than the CPU 101.

Second Embodiment

Figure 9:
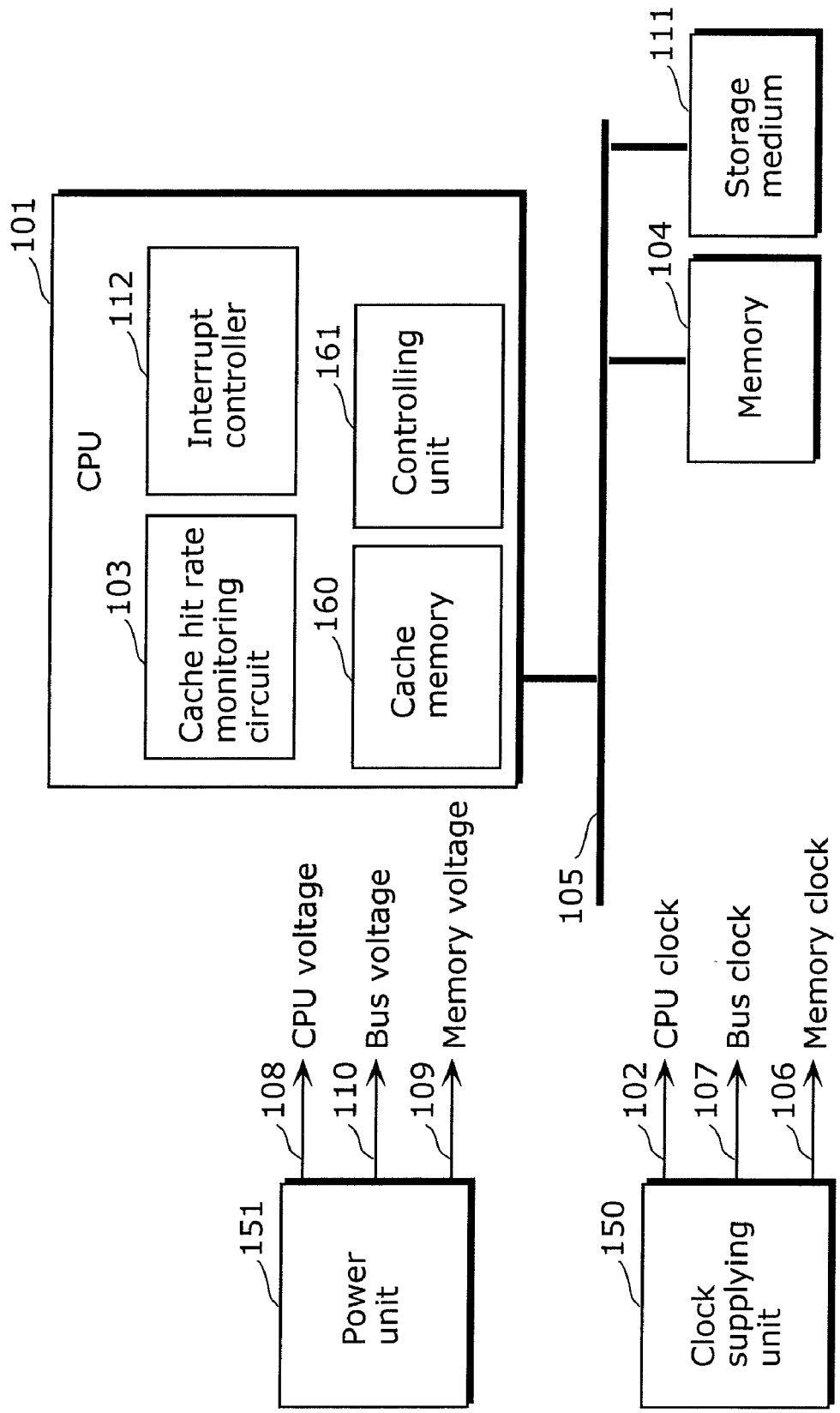
FIG. 9 is a block diagram showing configuration of an information processing device according to a second embodiment.

FIG. 9 is a block diagram showing configuration of an information processing device according to a second embodiment. FIG. 9 is different from FIG. 3 of the first embodiment in that a cache hit rate monitoring circuit 103 is added.

With the information processing device configured in the manner shown in FIG. 9, a cache hit rate predicting unit 201 in a controlling unit 161 obtains information about a current cache hit rate (hardware information) from the cache hit rate monitoring circuit 103, and predicts a cache hit rate 202 based on the obtained information.

Since the cache hit rate predicting unit 201 predicts the cache hit rate based on the information about the current cache hit rate obtained from the cache hit rate monitoring circuit 103, the prediction accuracy is higher compared to that of the first embodiment. The following is a description of some examples of operations of the cache hit rate predicting unit 201.

For example, the cache hit rate predicting unit 201 is activated on a regular basis by a timer and the like, and predetermined information is recorded in the cache hit rate predicting unit 201. Based on previously recorded information, the cache hit rate predicting unit 201 statistically determines the cache hit rate 202.

Further, when there is no predetermined process which causes the cache hit rate to decrease, there is a high likelihood that the hit rate rises. Thus, when there is no predetermined process which causes the cache hit rate to decrease, the cache hit rate predicting unit 201 predicts that the cache hit rate rises, and determines the cache hit rate 202 accordingly.

The ratio of a rise in the hit rate differs depending on the application program. Therefore, when there is no predetermined process which causes the cache hit rate to decrease, the cache hit rate predicting unit 201 predicts that the cache hit rate rises, and determines the cache hit rate 202 accordingly for each application program.

Also, the cache hit rate predicting unit 201: is activated on a regular basis; obtains and records hardware information; saves the obtained and recorded hardware information as a history; and statistically determines the cache hit rate 202 based on the hardware information recorded when the cache hit rate predicting unit 201 has previously been activated.

Next, it is assumed that the MMU in the CPU 101 has a TLB of a hardware table walk. When a temporal locality of an instruction and data is low, many miss hits of the TLB occur, and an updating-frequency of the TLB increases. In such a case, the cache hit rate is likely to be low. Therefore, the cache hit rate predicting unit 201 periodically monitors the TLB, predicts that the cache hit rate decreases when the updating-frequency of the TLB is high, and determines the cache hit rate 202 accordingly.

Furthermore, by periodically monitoring a program counter, the cache hit rate predicting unit 201 is capable of judging whether or not the temporal locality of the instruction is high. When the locality of the instruction is low, there is a likelihood that the cache hit rate is low. Therefore, the cache hit rate predicting unit 201 periodically monitors the program counter, predicts the cache hit rate in accordance with the locality of the instruction, and determines the cache hit rate 202 accordingly.

Moreover, the cache hit rate predicting unit 201 may record, on a regular basis, values of the cache hit rate monitoring circuit 103, predict the cache hit rate based on the recorded information, and determine the cache hit rate 202 accordingly.

Figure 10:
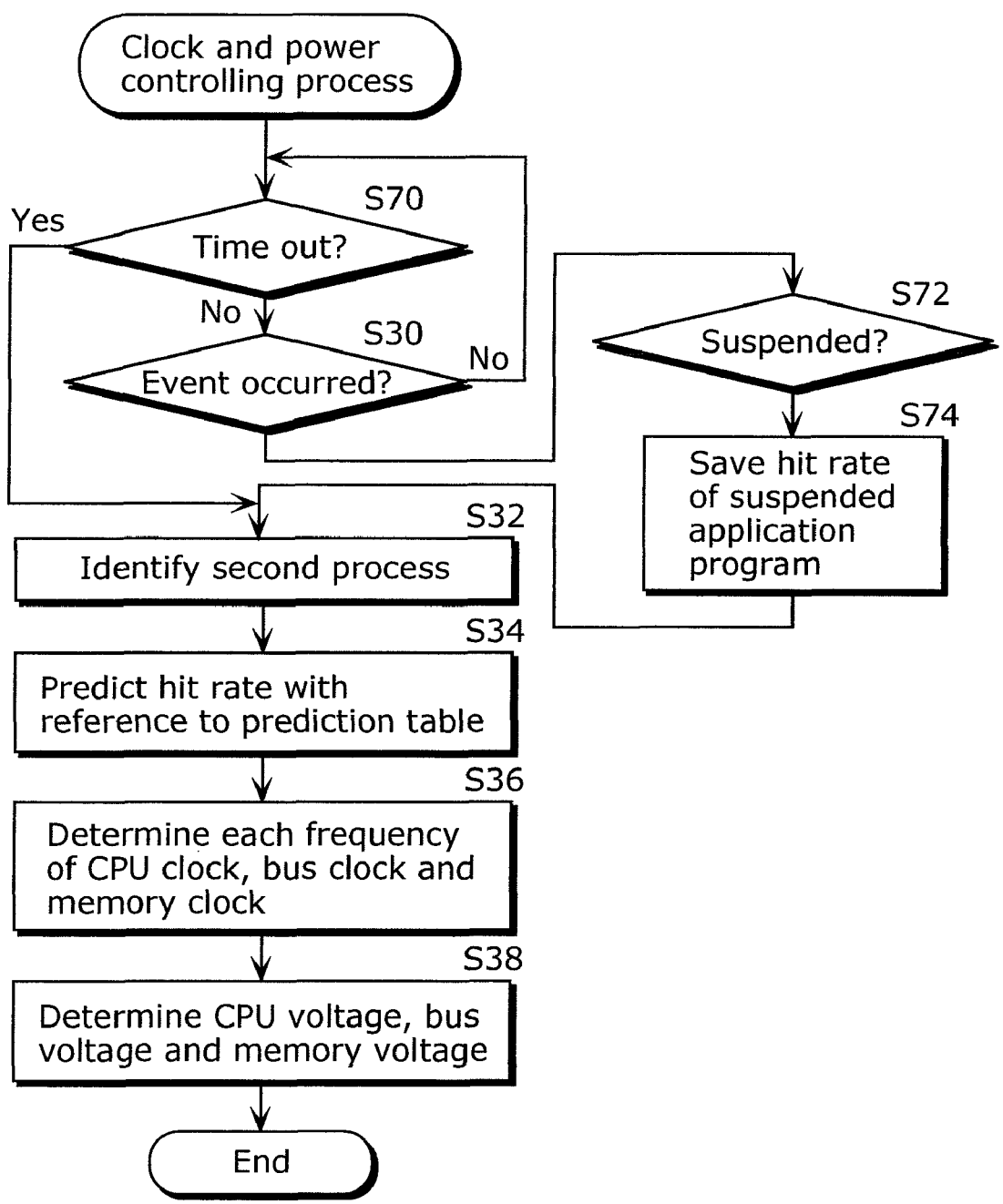
FIG. 10 is a flowchart showing a process performed by a cache hit rate predicting unit.

For example, as shown in the event No. 7 in FIG. 6A, when the second process which corresponds to an event is a process of suspending an application program which is being executed, the controlling unit 161, as shown in FIG. 10, saves information about the cache hit rate of the application program at the time of the suspension. Examples of the suspension include an exception process such as an interrupt, and a shift to a different application program.

After that, as shown in the event No. 8 in FIG. 6A, when the second process which corresponds to an event is a process of restarting the execution of the suspended application program, the cache hit rate predicting unit 201 determines the cache hit rate 202 based on the saved cache hit rate, at the time of the restart. The longer the time elapsed until the restart of the application program, the less the possibility that the CPU 101 still has, at the time of the restart, data of the application program which is to restart, and thus the cache hit rate decreases. Therefore, based on the time elapsed until the application program restarts, the cache hit rate predicting unit 201 determines the cache hit rate 202 of the application program.

For example, when there is more than one application program which needs to be executed, the OS switches an application program which is being executed at a point in time (application program A) to a different application program (application program B). Then after some time elapses, the OS switches the application program B back to the application program A. As with the case of the events No. 7 and 8 in FIG. 6A, the cache hit rate predicting unit 201 saves a cache hit rate of the application program A when the application program A is switched to the application program B. Then, when the application program A restarts, the cache hit rate 202 is determined based on the saved cache hit rate.

Further, as with the case of the events No. 7 and 8 in FIG. 6A, the cache hit rate predicting unit 201 saves information about a cache hit rate of an application program which has been executed until just before an exception process has occurred due to a system call or an interrupt. When the application program restarts, the cache hit rate predicting unit 201 predicts the cache hit rate based on the saved information about the cache hit rate, and determines the cache hit rate 202 accordingly.

Third Embodiment

Figure 12:
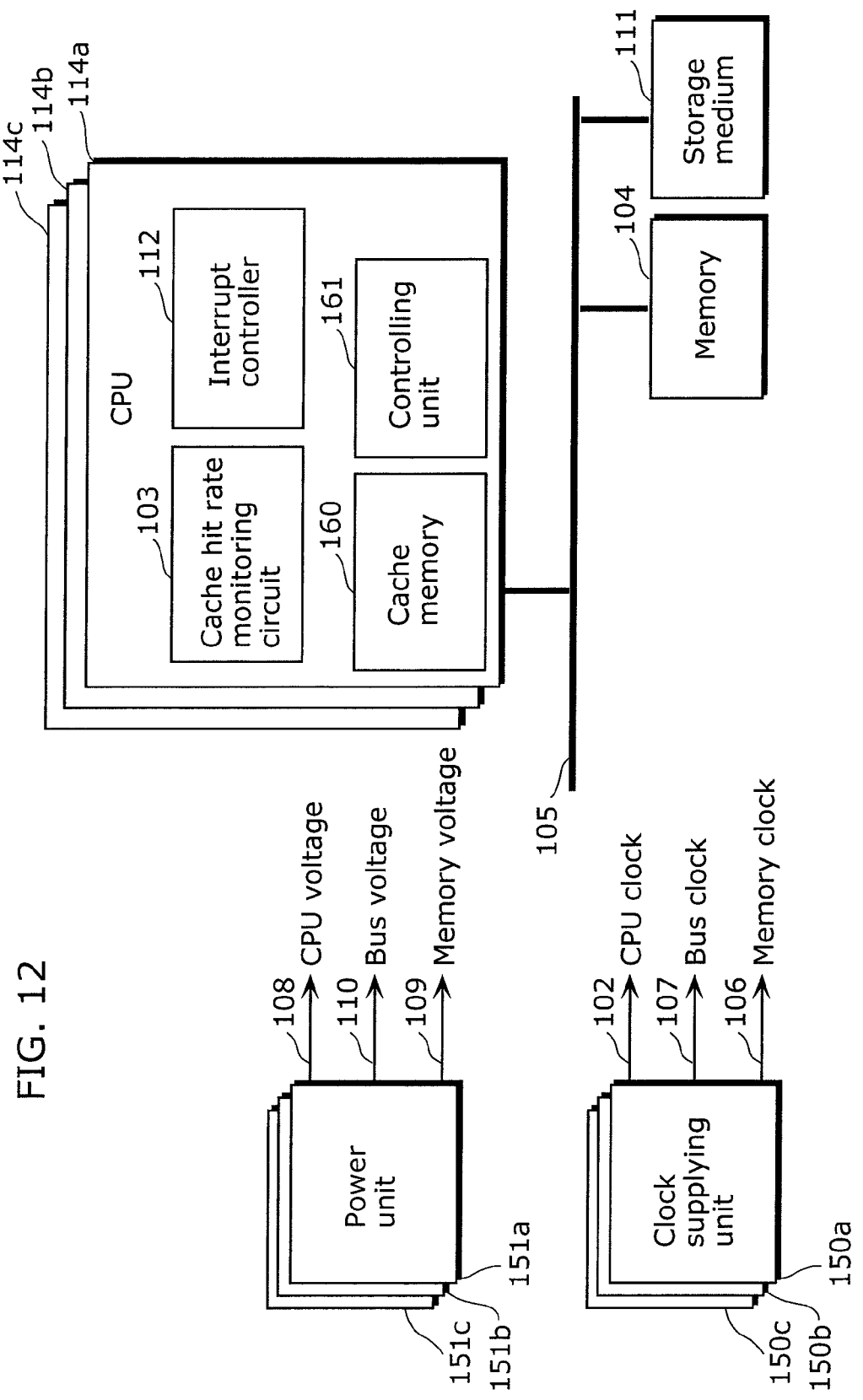
FIG. 12 is a block diagram showing configuration of an information processing device according to a third embodiment.

FIG. 12 is a block diagram showing configuration of an information processing device according to a third embodiment. FIG. 12 is different from FIG. 9 in that the information processing device shown in FIG. 12 has multiprocessor configuration. More specifically, the information processing device shown in FIG. 12 has plural sets of a CPU, a supplying unit, and a power unit, namely, CPUs 114a-114c, clock supplying units 150a-150c and power units 151a-151c.

With the information processing device configured in such manner as described above, a cache hit rate monitoring circuit 103, an interrupt controller 112, a cache memory 160, and a controlling unit 161 are mounted in each of the CPU 114a-114c, and a clock 102 in each of the CPU 114a-114c is independently controlled. However, it is necessary to arbitrate details of the setting of the frequencies between the CPU clock, the bus clock and the memory clock, or to fix these frequencies. It is also necessary to arbitrate details of the setting of the voltages between the CPU voltage, the bus voltage and the memory voltage to determine whether or not these voltages are to be fixed.

Fourth Embodiment

The present embodiment describes a program converting device which: statically predicts a cache hit rate in a processor instead of dynamically predicting the cache hit rate; and adds, in accordance with a predicting result, an instruction which specifies a frequency of a clock signal and an instruction which specifies a power voltage during a program execution.

Figure 13:
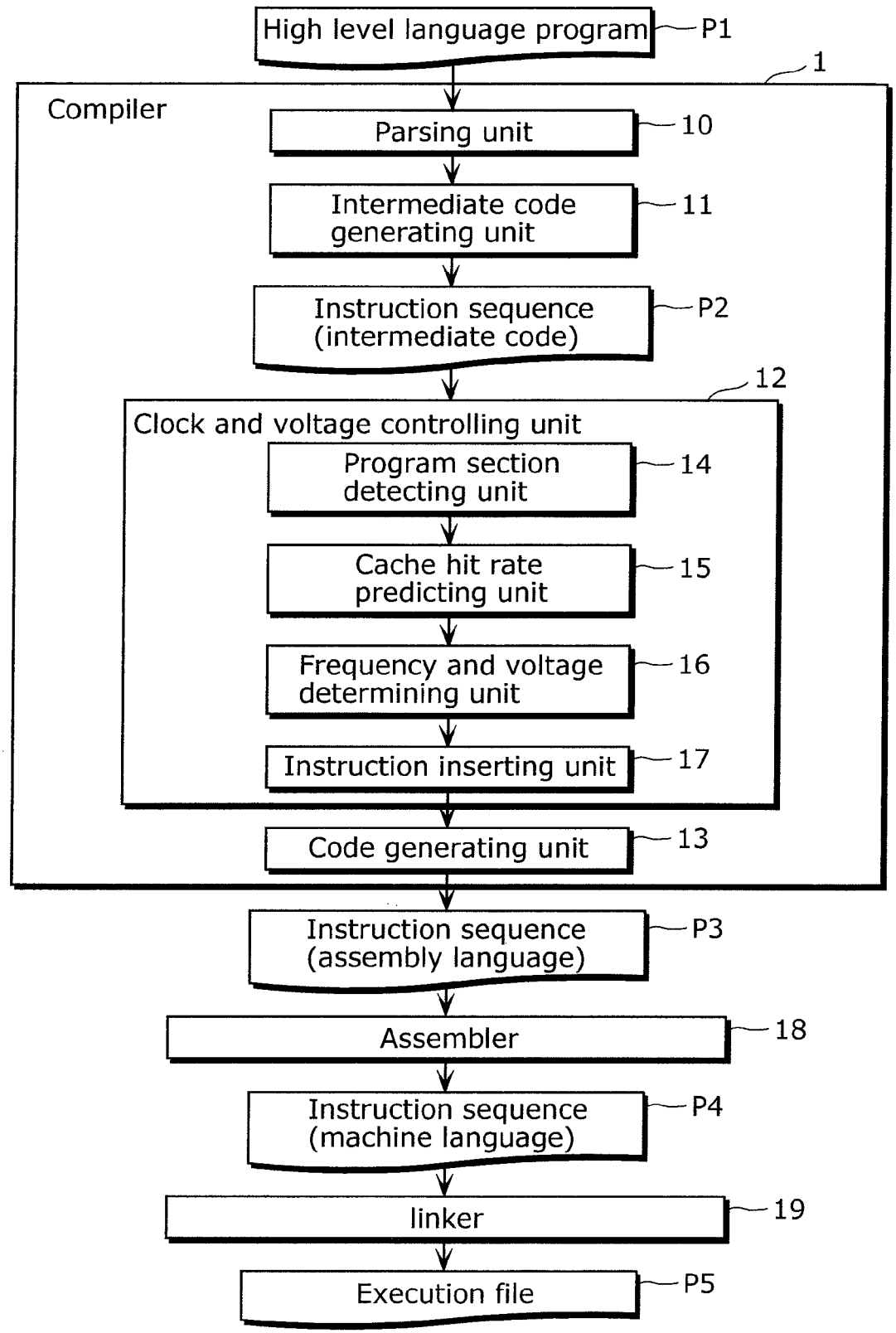
FIG. 13 is a block diagram showing configuration of a program converting device according to a fourth embodiment.

FIG. 13 is a block diagram showing configuration of the program converting device of the fourth embodiment. The program converting device of FIG. 13 includes a compiler 1, an assembler 18 and a linker 19. The compiler 1 includes a parsing unit 10, an intermediate code generating unit 11, a clock and voltage controlling unit 12, and a code generating unit 13. The program converting device shown in FIG. 13 is embodied by executing, on a computer, software which functions as a functional block.

The compiler 1 converts a program written in a high level language into a program written in an assembly language. The high level language is, for example, a C language.

The parsing unit 10 parses a high level language program P1 written in the high level language such as the C language.

The intermediate code generating unit 11 generates an intermediate code instruction sequence P2 which is the high level language program P1 rewritten in a writing format of an intermediate instruction (hereinafter simply referred to as "instruction") based on the parsing result.

The clock and voltage controlling unit 12 is equivalent to the controlling unit 161 of the first and the second embodiments. The clock and voltage controlling unit 12 predicts a hit rate of a predetermined program section, and adds, to the intermediate code instruction sequence P2, an instruction which specifies a frequency of a clock signal and an instruction which specifies a power voltage in the program section in accordance with the predicted hit rate. Here, the predetermined program section refers to a section of the second processes shown in FIGS. 6A, 6B and 11, in the intermediate code instruction sequence P2.

From the intermediate code instruction sequence P2 to which the above mentioned instruction is added by the clock and voltage controlling unit 12, the code generating unit 13 generates an instruction sequence (an instruction sequence of a mnemonic format written in the assembly language.

The clock and voltage controlling unit 12 in FIG. 13 includes a program section detecting unit 14, a cache hit rate predicting unit 15, a frequency and voltage determining unit 16 and an instruction inserting unit 17.

The program section detecting unit 14 detects program sections which correspond to the second processes shown in FIGS. 6A, 6B and 11. In doing so, the program section detecting unit 14 may detect the first process (occurrence of an event, a system call, a software interrupt) described in the first and the second embodiments, and detect the second process (program section) which is to restart (or to be called) as a result of the first process.

The cache hit rate predicting unit 15 predicts a cache hit rate of the program section detected by the program section detecting unit 14. As with Step S34 shown in FIG. 5, the cache hit rate is predicted by referring to a prediction table (FIGS. 6A and 6B, for example).

The frequency and voltage determining unit 16 determines each frequency of a CPU clock, a bus clock and a memory clock, in accordance with the hit rate predicted by the cache hit rate predicting unit 15. Further, the frequency and voltage determining unit 16 determines a CPU voltage, a bus voltage and a memory voltage in accordance with the hit rate predicted by the cache hit rate predicting unit 15. These determinations of the frequencies and the voltages are the same as the determinations in Steps S36 and S38 shown in FIG. 5.

The instruction inserting unit 17 adds the following instructions to the head of the program section detected by the program section detecting unit 14: an instruction which specifies, to a clock supplying unit, the frequencies determined by the frequency and voltage determining unit 16; and an instruction which specifies, to a power unit, the power voltages determined by the frequency and voltage determining unit 16. Note that the instruction inserting unit 17 may insert the above described instructions at the end of the first process which calls up the program section, instead of inserting the instructions to the head of the program section.

From the intermediate code instruction sequence which is the instruction sequence after the above described instructions are inserted by the instruction inserting unit 17, the code generating unit 13 generates an instruction sequence written in the assembly language (mnemonic instruction sequence).

The assembler 18 converts an instruction sequence written in the assembly language into a machine language instruction sequence.

The linker 19 links plural machine language instruction sequences, and generates an execution file.

As described above, the program converting device according to the present embodiment statically predicts a cache hit rate at the stage of compiling, and adds an instruction which specifies a frequency of a clock signal, and an instruction which specifies a power voltage during a program execution in accordance with the predicting result. Therefore, it is possible to eliminate an overhead created when a processor dynamically inserts the above described instructions, and to improve the processing capability. Further, since the program converting device according to the present embodiment is capable of converting an existing program, the present invention can be applied even to a CPU which does not have the controlling unit 161 of the first through to third embodiments.

Note that although the program converting device according to the fourth embodiment inserts the above described instructions into the intermediate code instruction sequence P2 in the compiler, the following may be performed instead: (i) insert, into the high level language program P1, a program statement (such as a function) which corresponds to the above described instructions; (ii) insert, into the assembly language instruction sequence, a mnemonic instruction which corresponds to the above described instructions; or (iii) insert, into the machine language instruction sequence, a machine language instruction which corresponds to the above described instructions. Furthermore, the first processes or the second processes are classified according to in which stages, among the above described (i), (ii) and (iii), each first and second process can most easily be detected, and the process of the clock and voltage controlling unit 12 may be performed at the stage corresponding to the classified first or second process.

The present invention is suitable for a method of controlling a clock frequency and a power voltage of an information processing device, an information processing device, a program, and a program converting method, and in particular to: an information processing device having a processor which has a cache memory and a clock supplying unit which supplies a clock signal to the processor; a program for an operating system of the information processing device; a compiler for the information processing device; and a program converting device such as an assembler.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of controlling an information processing device which includes a processor having a cache memory, and a clock supplier that supplies a clock signal to the processor, the method comprising:
    predicting a hit rate of the cache memory; and
    controlling the clock supplier so as to change a frequency of the clock signal in accordance with the predicted hit rate,
    wherein the predicting includes:
        detecting an occurrence of a first process in the processor;
        identifying a type of a second process which starts as a result of the detected occurrence of the first process; and
        calculating the hit rate in accordance with the identified type,
    the information processing device further includes a memory manager operable to convert a virtual address into an actual address for virtual storage of a demand loading mechanism,
    the first process is an access violation in the memory manager, and
    the predicting includes calculating that the hit rate falls below a predetermined value when the second process is identified as a process of performing demand loading.

2. The method of controlling the information processing device according to claim 1,
    wherein the predicting further includes calculating that the hit rate increases above a predetermined value when the first process is not detected during a predetermined period of time.

3. The method of controlling the information processing device according to claim 1,
    wherein the first process further comprises an event which occurs in an operating system, and
    the predicting further includes calculating that the hit rate falls below a predetermined value when the second process is identified as a process of transferring data between a recording medium and a memory.

4. The method of controlling the information processing device according to claim 3,
    wherein the predicting includes calculating the hit rate in accordance with a size of the data transferred.

5. The method of controlling the information processing device according to claim 3,
    wherein the predicting further includes calculating that the hit rate falls below the predetermined value when the second process is identified as a process of activating a new application program; a process of flushing the cache memory; or a process of copying a region between the memories.

6. The method of controlling the information processing device according to claim 1,
    wherein the memory manager further has a table of a software table walk, for temporarily flushing the virtual address and the actual address corresponding to the virtual address,
    the first process is an access miss in the table, and
    the predicting includes calculating that the hit rate falls below the predetermined value when the second process is identified as a process of updating the table.

7. The method of controlling the information processing device according to claim 1,
    wherein the first process is further comprises a system call, and the predicting further includes:
identifying a system call number as the second process; and
calculating the hit rate in accordance with the identified system call number.

8. The method of controlling the information processing device according to claim 1,
wherein the information processing device further includes a monitor operable to monitor the hit rate of the cache memory, and
the predicting further includes calculating the hit rate based on a history of a hit rate monitored by the monitor.

9. The method of controlling the information processing device according to claim 1,
wherein the information processing device further includes a power supply operable to supply power to the processor, and
the controlling further includes controlling the power supply so as to change a power voltage of the power supplied to the processor in accordance with the predicted hit rate.

10. A method of controlling an information processing device, which includes a processor having a cache memory, and a clock supplier that supplies a clock signal to the processor, the method comprising:
predicting a hit rate of the cache memory; and
controlling the clock supplier so as to change a frequency of the clock signal in accordance with the predicted hit rate,
wherein the predicting includes:
detecting an occurrence of a first process in the processor;
identifying a type of a second process which starts as a result of the detected occurrence of the first process; and
calculating the hit rate in accordance with the identified type,
the first process comprises an interrupt, and
the predicting includes:
calculating that the hit rate is higher than a predetermined value when the second process is identified as a pre-process of identifying a type of the interrupt; and
calculating that the hit rate is lower than the predetermined value when the second process is identified as an individual process unique to the identified type of the interrupt.

11. The method of controlling the information processing device according to claim 10,
wherein the predicting further includes:
identifying a type of an input/output when the individual process is a process of controlling the input/output; and
calculating the hit rate in accordance with the identified type of the input/output.

12. The method of controlling the information processing device according to claim 10, further comprising
measuring an occurrence-frequency of the interrupt for each type of the interrupt,
wherein the predicting further includes calculating the hit rate in accordance with the occurrence-frequency of the identified individual process.

13. A method of controlling an information processing device, which includes a processor having a cache memory, and a clock supplier that supplies a clock signal to the processor, the method comprising:
predicting a hit rate of the cache memory; and
controlling the clock supplier so as to change a frequency of the clock signal in accordance with the predicted hit rate,
wherein the predicting includes:
detecting an occurrence of a first process in the processor;
identifying a type of a second process which starts as a result of the detected occurrence of the first process; and
calculating the hit rate in accordance with the identified type,
the information processing device includes a monitoring unit operable to monitor the hit rate of the cache memory,
the method of controlling the information processing device further comprises
saving a hit rate of an application program when the application program is suspended,
the first process is comprises a process of restarting the suspended application program, and
the predicting includes:
identifying a type of the application program which needs to restart; and
calculating a hit rate of the restarted application program in accordance with the saved hit rate of the identified application program.

14. The method of controlling the information processing device according to claim 13,
wherein the predicting includes calculating the hit rate in accordance with a period of time from when the application program is suspended until when the suspended application program restarts.

15. A method of controlling an information processing device, which includes a processor having a cache memory, and a clock supplier that supplies a clock signal to the processor, the method comprising:
predicting a hit rate of the cache memory; and
controlling the clock supplier so as to change a frequency of the clock signal in accordance with the predicted hit rate,
wherein the predicting includes:
detecting an occurrence of a first process in the processor;
identifying a type of a second process which starts as a result of the detected occurrence of the first process; and
calculating the hit rate in accordance with the identified type,
the information processing device includes a memory manager operable to convert a virtual address into an actual address for virtual storage of a demand loading mechanism,
the memory manager further has a table of a hardware table walk, for temporarily flushing the virtual address and the actual address corresponding to the virtual address, and
the predicting includes calculating the hit rate based on an updating-frequency and the history of the past hit rate.

16. An information processing device, comprising:
a processor having a cache memory;
a clock supply operable to supply a clock signal to said processor;
a predictor operable to predict a hit rate of said cache memory;
a controller operable to control said clock supply so as to change a frequency of the clock signal in accordance with the predicted hit rate; and a memory manager operable to convert a virtual address into an actual address for virtual storage of a demand loading mechanism, wherein the predictor predicts the hit rate of said cache memory by:

detecting an occurrence of a first process in said processor, the first process comprising an access violation in the memory manager;

identifying a type of a second process which starts as a result of the detected occurrence of the first process; and calculating the hit rate in accordance with the identified type, wherein said predicator predicts that the hit rate falls below a predetermined value when the second process is identified as a process of performing demand loading.

17. A computer-readable program stored on a non-transitory computer-readable storage medium for controlling a computer which includes a clock supply that supplies a clock signal to a processor, the program causing the computer to execute:

predicting a hit rate of a cache memory; and controlling the clock supply so as to change a frequency of the clock signal in accordance with the predicted hit rate, wherein the predicting includes:

detecting an occurrence of a first process in the processor;

identifying a type of a second process which starts as a result of the detected occurrence of the first process; and calculating the hit rate in accordance with the identified type, wherein the processor further includes a memory manager operable to convert a virtual address into an actual address for virtual storage of a demand loading mechanism, the first process comprises an access violation in the memory manager, and the predicting predicts that the hit rate falls below a predetermined value when the second process is identified as a process of performing demand loading.

18. A program converting method of converting a first program into a second program, wherein the second program is used for an information processing device which includes a processor having a cache memory and a clock supply operable to supply a clock signal to the processor, the program converting method comprises:

predicting a hit rate of the cache memory in a predetermined section of the first program; and generating the second program by adding, to the first program, an instruction which specifies a frequency of the clock signal in the predetermined section in accordance with the predicted hit rat;

wherein the predicting includes:

detecting an occurrence of a first process in the processor;

identifying a type of a second process which starts as a result of the detected occurrence of the first process; and calculating the hit rate in accordance with the identified type, the information processing device further includes a memory manager operable to convert a virtual address into an actual address for virtual storage of a demand loading mechanism, the first process is an access violation in the memory manager, and the predicting includes calculating that the hit rate falls below a predetermined value when the second process is identified as a process of performing demand loading.

* * * * *